United States Patent
Harrison

(10) Patent No.: US 8,395,916 B2
(45) Date of Patent: Mar. 12, 2013

(54) SWITCHED MODE POWER SUPPLY AND METHOD OF PRODUCTION

(75) Inventor: Michael John Harrison, Christchurch (NZ)

(73) Assignee: Eaton Industries Company, Christchurch (NZ)

( * ) Notice: Subject to any disclaimer, the term of this patent is extended or adjusted under 35 U.S.C. 154(b) by 53 days.

(21) Appl. No.: 12/441,471

(22) PCT Filed: Aug. 13, 2007

(86) PCT No.: PCT/NZ2007/000215
§ 371 (c)(1),
(2), (4) Date: Jul. 17, 2009

(87) PCT Pub. No.: WO2008/035988
PCT Pub. Date: Mar. 27, 2008

(65) Prior Publication Data
US 2010/0014322 A1    Jan. 21, 2010

(30) Foreign Application Priority Data

Sep. 21, 2006  (NZ) ........................................ 550043

(51) Int. Cl.
*H02J 1/10*    (2006.01)
(52) U.S. Cl. ............... 363/65; 363/17; 363/69; 363/132
(58) Field of Classification Search ............... 363/17, 363/20, 21.14, 56.02, 132, 136, 15, 16, 18, 363/98, 65, 69
See application file for complete search history.

(56) References Cited

U.S. PATENT DOCUMENTS

| 5,301,240 | A | 4/1994 | Stockum et al. |
| 5,659,465 | A * | 8/1997 | Flack et al. ..................... 363/71 |
| 6,400,580 | B1 * | 6/2002 | Bowman et al. ................ 363/17 |
| 6,567,278 | B2 * | 5/2003 | Rufer et al. ..................... 363/17 |
| 6,583,999 | B1 | 6/2003 | Spindler |
| 6,954,368 | B1 * | 10/2005 | Francoeur et al. ............ 363/144 |
| 2004/0189095 | A1 | 9/2004 | Lin et al. |
| 2005/0041439 | A1 | 2/2005 | Jang et al. |
| 2005/0174809 | A1 | 8/2005 | Lipcsei et al. |
| 2005/0226018 | A1 | 10/2005 | Chen et al. |
| 2006/0120120 | A1 * | 6/2006 | Lin et al. .......................... 363/65 |
| 2006/0181252 | A1 * | 8/2006 | Yoshida et al. ................ 323/247 |
| 2007/0091659 | A1 * | 4/2007 | Lin et al. ........................ 363/127 |
| 2008/0278969 | A1 * | 11/2008 | Bolz et al. ....................... 363/17 |

FOREIGN PATENT DOCUMENTS

EP    1061629 B1    12/2000
JP    2005168266 A    6/2005

OTHER PUBLICATIONS

International Search Report, PCT/NZ2007/000215; Jan. 30, 2008.
International Preliminary Report on Patentability; Dec. 22, 2008.

* cited by examiner

*Primary Examiner* — Nguyen Tran
(74) *Attorney, Agent, or Firm* — Myers Bigel Sibley & Sajovec, P.A.

(57) ABSTRACT

A switched mode power supply allowing a half bridge converter to be use alone or in combination with another converter to form a full bridge converter. A common controller may be used for either half bridge or full bridge configurations. The modular approach simplifies design for a range of power supplies and reduces costs.

21 Claims, 2 Drawing Sheets

US 8,395,916 B2

SWITCHED MODE POWER SUPPLY AND METHOD OF PRODUCTION

FIELD OF THE INVENTION

This invention relates to a switched mode power supply and a method of producing a full bridge converter from two half bridge converters. The design allows a standard half bridge converter to be use alone or in combination with another converter to form a full bridge converter.

BACKGROUND OF THE INVENTION

Traditional AC/DC switched mode power supplies for the telecommunications industry follow a general design based around two individual cascaded power converters. The first power conversion stage typically performs the function of Power Factor Correction (PFC) and is almost exclusively based around a non-isolated boost converter topology. The second power conversion stage performs the functions of galvanic isolation and voltage transformation/control. A number of distinctly different circuit topologies have been successfully employed to perform the second stage of conversion. Some of the topologies that are commonly used are: Single switch forward converter, 2-switch forward converter, Half-bridge converter, and the Full-bridge converter. These converters may either employ hard or soft switching of the power switching transistors and/or diodes and all references to converters in this specification shall encompass either switching technique.

The different power converter topologies form a spectrum of design solutions with the simpler topologies best satisfying the requirements for low parts count in small power supplies, and the more complex topologies justifying their added complexity due to their improved performance in large power supplies.

A power supply manufacturer who provides a range of different power level solutions will therefore tend to face the need to develop a number of different product solutions, usually based on a range of different power conversion topologies. Each of these design solutions has its intendant engineering costs: design validation, compliance testing, production support, and product support. Any engineering solution that could result in a simple scalable product design can reduce this engineering cost as well as gaining volume-manufacturing efficiencies.

It is an object of this invention to provide a design that reduces the cost of design and provides a relatively simple and cost effective range of power supplies or to at least provide the public with a useful choice.

SUMMARY OF THE INVENTION

According to a first aspect there is provided a switched mode power supply including:
  first and second half bridge converters interconnected to form a full bridge converter; and
  a control circuit for controlling the first and second controllers.

According to a further aspect there is provided a method of producing a switched mode power supply comprising:
  a. providing two separate half bridge converters;
  b. providing a control circuit;
  c. connecting the half bridge converters so as to form a full bridge converter; and
  d. connecting drive outputs of the control circuit to respective switches of the half bridge converters in such a manner that it drives the converters as a full bridge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DESCRIPTION OF EMBODIMENTS OF THE INVENTION

Figure 1:
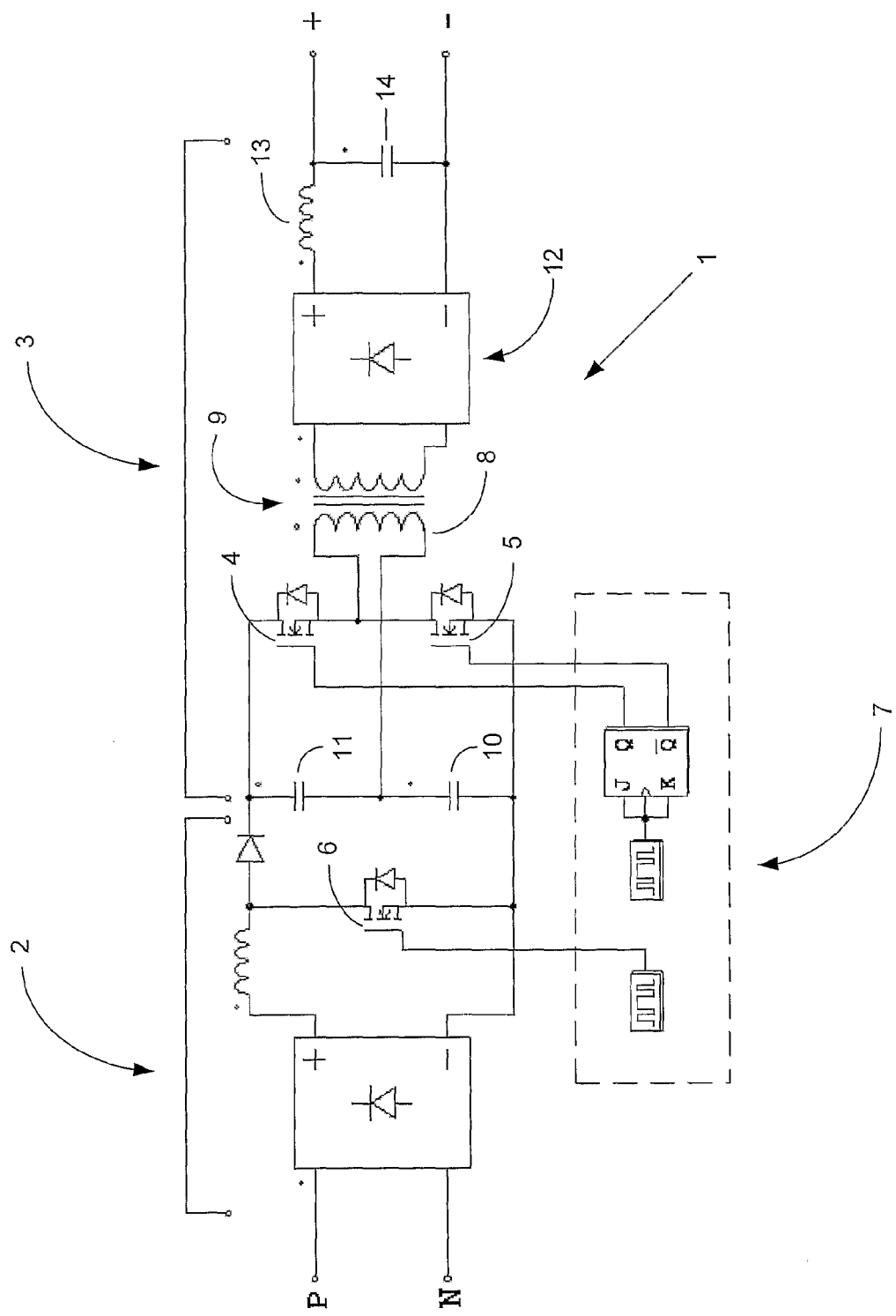
FIG. 1 shows a two stage power supply with a boost first stage followed by a half bridge converter.

FIG. 1 shows a power supply 1 having a boost converter stage 2 followed by a half bridge converter 3. Switches 4 and 5 of half bridge converter 3 and switch 6 of boost converter 2 are driven by control circuit 7. The drive signals from control circuit 7 to switches 4 and 5 may be isolated by devices such as signal isolating transformers etc. as is known in the art. Control circuit 7 monitors output voltage and current and controls switches 4 and 5 so as to bring the monitored output current and voltage towards desired values. Switches 4 and 5 are driven by signals which are the logical inverse of one another so that they are alternately switched on and off. Input voltage and/or current may also be monitored and switch 6 may be controlled so as to achieve power factor correction (PFC).

The primary coil 8 of transformer 9 is connected between the output of the half bridge and the mid voltage point defined between capacitors 10 and 11. The output of transformer 9 is then rectified by rectifier 12 and filtered by the filter formed by inductor 13 and capacitor 14.

Where a higher power application is required two such power supplies could be connected in parallel (i.e. AC inputs connected in parallel and DC outputs connected in parallel). However, this would require two control circuits and would not enjoy the benefits of full bridge operation.

Figure 2:
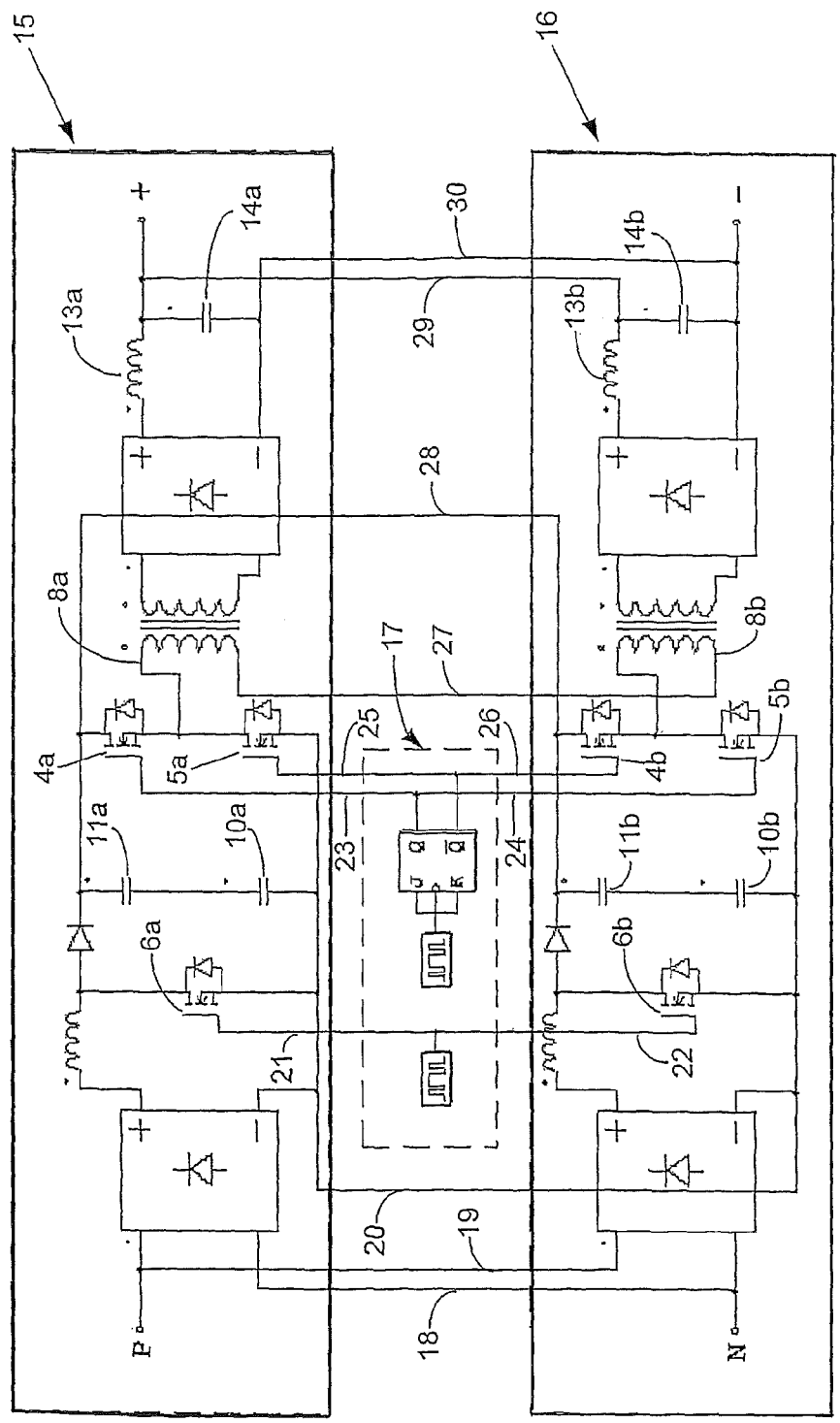
FIG. 2 shows a power supply having a full bridge converter formed by combining two power supplies as shown in FIG. 1.

FIG. 2 shows an arrangement in which two converters of the type shown in FIG. 1 are connected together so as to form a full bridge converter output stage. Power supplies 15 and 16 are interconnected so as to form a full bridge converter with both converters driven by common control circuit 17.

The AC inputs to the converters are connected in parallel by lines 18 and 19. The outputs are connected in parallel by lines 29 and 30. The DC rails of the converters are connected in parallel by lines 20 and 28. The switches 6a and 6b of the boost converters are commonly driven by control circuit 17. Top switch 4a and bottom switch 5b are commonly driven via lines 23 and 24 by a non-inverting output of control circuit 17. Bottom switch 5a and top switch 4b may be commonly driven via lines 25 and 26 of control circuit 17.

Power supplies 15 and 16 may be in the form of PCBs stacked on top of one another with lines 18, 19, 20, 27, 28, 29 and 30 in the form of conductive pins soldered to commonly located points on each PCB. Lines 21, 22, 23, 24, 25 and 26 may be in the form of flexible wires from control circuit 17 to respective PCBs 15 and 16. Alternatively control circuit 17 could be integrally formed on one of the PCBs 15 or 16 with lands formed on the PCB to facilitate the connection of conductors to a PCB without a control circuit.

Instead of connecting the lower ends of primary windings to the junction of the capacitors those ends are interconnected via line 27. The series connection of primary windings 8a and 8b across the outputs of the switches 4a and 5a and 4b and 5b and the arrangement for driving those switches provides full bridge operation. This results in improved output waveforms and requires only a single control circuit, reducing cost and complexity. This integrated design also allows all components to be housed in a single enclosure using a single fan. This approach allows a single power supply design to be used for different power level applications; reducing design cost and simplifying manufacture and inventory management. Although this concept has been described in relation to a two stage AC/DC power supply it is equally applicable to a single stage power supply.

While the present invention has been illustrated by the description of the embodiments thereof, and while the embodiments have been described in detail, it is not the intention to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

What I claim is:

1. A switched mode power supply including:
   interconnected first and second half bridge units; and
   a control circuit configured to operate the interconnected first and second half bridge units as a full bridge converter,
   wherein the first and second half bridge units are separable units configured to be interconnected to one another and wherein the first and second half bridge units and the control circuit are configurable to a first configuration wherein the control circuit operates at least one of the first and second half bridge units as a half bridge converter and a second configuration where the control circuit operates the first and second half-bridge units together as a full bridge converter.

2. A switched mode power supply as claimed in claim 1 wherein the outputs of the first and second half bridge units are connected to series connected primary windings of respective output transformers.

3. A switched mode power supply as claimed in claim 1 wherein the first and second half bridge units are provided on separate circuit boards.

4. A switched mode power supply as claimed in claim 1 wherein the control circuit is provided on a separate circuit board.

5. A switched mode power supply as claimed in claim 3 wherein the control circuit is provided on a separate circuit board.

6. A switched mode power supply as claimed in claim 1 wherein respective ones of the first and second half bridge units comprise respective first and second boost stages.

7. A switched mode power supply as claimed in claim 3 wherein respective ones of the first and second half bridge units comprise respective first and second boost stages.

8. A switched mode power supply as claimed in claim 4 wherein respective ones of the first and second half bridge units comprise respective first and second boost stages.

9. A switched mode power supply as claimed in claim 5 wherein respective ones of the first and second half bridge units comprise respective first and second boost stages.

10. A switched mode power supply as claimed in claim 1 wherein the control circuit monitors the output voltage and current of the power supply and controls switching of the first and second half bridge units to achieve a desired output voltage and current.

11. A switched mode power supply as claimed in claim 3 wherein the control circuit monitors the output voltage and current of the power supply and controls switching of the first and second half bridge units to achieve a desired output voltage and current.

12. A switched mode power supply as claimed in claim 4 wherein the control circuit monitors the output voltage and current of the power supply and controls switching of the first and second half bridge units to achieve a desired output voltage and current.

13. A switched mode power supply as claimed in claim 1 wherein a top switch of the first half bridge unit and a bottom switch of the second half bridge unit are driven by a first drive signal from the control circuit and a bottom switch of the first half bridge unit and a top switch of the second half bridge unit are driven by a second drive signal from the control circuit, wherein the second drive signal is the logical inverse of the first drive signal.

14. A switched mode power supply as claimed in claim 3 wherein a top switch of the first half bridge unit and a bottom switch of the second half bridge unit are driven by a first drive signal from the control circuit and a bottom switch of the first half bridge unit and a top switch of the second half bridge unit are driven by a second drive signal from the control circuit, wherein the second drive signal is the logical inverse of the first drive signal.

15. A switched mode power supply as claimed in claim 4 wherein a top switch of the first half bridge unit and a bottom switch of the second half bridge unit are driven by a first drive signal from the control circuit and a bottom switch of the first half bridge unit and a top switch of the second half bridge unit are driven by a second drive signal from the control circuit, wherein the second drive signal is the logical inverse of the first drive signal.

16. A method of producing a switched mode power supply comprising:
   providing first and second separable half bridge units that are configured to be electrically interconnected;
   providing a control circuit configurable to individually operate at least one of the first and second half bridge units as a half bridge converter in a first configuration and to operate the first and second half bridge units together as a full bridge converter;
   connecting the first and second half bridge units so as to form a full bridge converter; and
   connecting the control circuit to the connected first and second half bridge units in such a manner that it operates the connected first and second half bridge units as a full bridge converter.

17. A method as claimed in claim 16 including the step of connecting outputs of the connected first and second half bridge units to series connected primary windings of respective first and second output transformers.

18. A method as claimed in claim 16 including the step of connecting a top switch of the first half bridge unit and a bottom switch of the second half bridge unit to a first drive signal output of the control circuit and a bottom switch of the first half bridge unit and a top switch of the second half bridge unit to a second drive signal output of the control circuit, wherein the second drive signal is the logical inverse of the first drive signal.

19. A method as claimed in claim 17 including the step of connecting a top switch of the first half bridge unit and a bottom switch of the second half bridge unit to a first drive signal output of the control circuit and a bottom switch of the first half bridge unit and a top switch of the second half bridge unit to a second drive signal output of the control circuit, wherein the second drive signal is the logical inverse of the first drive signal.

20. A switched mode power supply as claimed in claim 1, further comprising:

first and second transformers having primary windings connected in series and coupled to outputs of the first and second half bridge units; and respective first and second rectifiers coupled to respective secondary windings of respective ones of the first and second transformers.

21. A method as claimed in claim 17, further comprising connecting respective first and second rectifiers to respective secondary windings of respective ones of the first and second output transformers.

* * * * *

UNITED STATES PATENT AND TRADEMARK OFFICE
CERTIFICATE OF CORRECTION

| | | |
|---|---|---|
| PATENT NO. | : 8,395,916 B2 | Page 1 of 1 |
| APPLICATION NO. | : 12/441471 | |
| DATED | : March 12, 2013 | |
| INVENTOR(S) | : Michael John Harrison | |

It is certified that error appears in the above-identified patent and that said Letters Patent is hereby corrected as shown below:

In the Specification:
Column 1, Line 3: After the title, please insert the section below:

-- RELATED APPLICATIONS
The present application is a 35 U.S.C. §371 national phase application of PCT International Application No. PCT/NZ2007/000215, having an international filing date of August 13, 2007, claiming priority to New Zealand Patent Application No. 550043, filed September 21, 2006. The disclosures of each application are incorporated herein by reference in their entireties. The above PCT International Application was published in the English language and has International Publication No. WO 2008/035988 A1. --

Column 1, Line 58: Correct "first and second half bridge"
                   to read -- first and second discrete half bridge --

Column 1, Line 64: Correct "two separate half bridge"
                   to read -- two discrete half bridge --

Signed and Sealed this
Twenty-seventh Day of May, 2014

Michelle K. Lee
*Deputy Director of the United States Patent and Trademark Office*